United States Patent
Ikeda et al.

(10) Patent No.: US 7,294,418 B2
(45) Date of Patent: Nov. 13, 2007

(54) MAGNETIC FILM FOR MAGNETIC HEAD

(75) Inventors: Shoji Ikeda, Sendai (JP); Takayuki Kubomiya, Kawasaki (JP); Masaaki Matsuoka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 163 days.

(21) Appl. No.: 10/786,840

(22) Filed: Feb. 25, 2004

(65) Prior Publication Data

US 2005/0003234 A1    Jan. 6, 2005

(30) Foreign Application Priority Data

Jul. 4, 2003    (JP)    ............... 2003-192020

(51) Int. Cl.
G11B 5/31    (2006.01)

(52) U.S. Cl. ............ 428/816; 428/812; 428/813; 428/815; 360/110

(58) Field of Classification Search ............ None
See application file for complete search history.

(56) References Cited

U.S. PATENT DOCUMENTS

| | | | | |
|---|---|---|---|---|
| 5,301,975 A | * | 4/1994 | Rivera | 280/304.1 |
| 5,523,172 A | | 6/1996 | Saito et al. | 428/611 |
| 5,578,385 A | | 11/1996 | Saito et al. | 428/611 |
| 5,585,196 A | * | 12/1996 | Inomata et al. | 428/811.3 |
| 5,587,026 A | * | 12/1996 | Iwasaki et al. | 148/313 |
| 5,589,278 A | * | 12/1996 | Kamijo | 428/811.3 |
| 5,616,370 A | * | 4/1997 | Okuno et al. | 427/547 |
| 5,700,588 A | | 12/1997 | Saito et al. | 428/611 |
| 6,063,512 A | * | 5/2000 | Osaka et al. | 428/812 |
| 6,303,218 B1 | * | 10/2001 | Kamiguchi et al. | 428/332 |
| 6,662,432 B2 | * | 12/2003 | Balamane et al. | 29/603.07 |
| 2002/0150790 A1 | * | 10/2002 | Ikeda et al. | 428/692 |
| 2002/0187565 A1 | * | 12/2002 | Inoue et al. | 438/3 |
| 2004/0120074 A1 | * | 6/2004 | Okada et al. | 360/126 |

OTHER PUBLICATIONS

Sun, N. and Wang, S., IEEE Trans. Mag., 36(5), Sep. 2000, 2506-2508.*

Katada, H., Shimatsu, T., Watanabe, I., Muraoka, H., and Nakamura, Y., IEEE Trans. Mag., 38(5), Sep. 2002, 2225-2227.*

"Intermetallic Compounds, vol. 4—Magnetic, Electrical and Optical Properties and Applications of Intermetallic Compounds", John Wiley & Sons, Pub., 2000, Westbrook, J., Fleisher, R., Eds., pp. 31-33.*

* cited by examiner

*Primary Examiner*—Kevin M. Bernatz
(74) *Attorney, Agent, or Firm*—Greer, Burns & Crain, Ltd

(57) ABSTRACT

The magnetic film includes an FeCo layer, restrains erasing data by a magnetic field leaked from a magnetic pole, has high saturation magnetic flux density and soft magnetism and writes data with high recording density. The magnetic film for a magnetic head of the present invention comprises: a nonmagnetic layer including at least one selected from a group of Ru, Rh, Ir, Cr, Cu, Au, Ag, Pt and Pd; a magnetic layer including Fe and Co. Anisotropy magnetic field is 0.8 kA/m or more.

8 Claims, 9 Drawing Sheets

MAGNETIC FILM FOR MAGNETIC HEAD

BACKGROUND OF THE INVENTION

The present invention relates to a magnetic film for a magnetic head, more precisely relates to a magnetic film for a write-head of a magnetic head, especially a perpendicular recording head, which is capable of intensifying a writing magnetic field, improving magnetic response and raising recording density.

Conventionally, many elements have been used for multilayered magnetic films so as to achieve many purposes. For example, a giant magnetic resistance was found in a Fe/Cr multilayered film, so that a spin valve film for a read-head was invented (see Phys. Rev. Lett., vol. 62, p. 2472 (1988)). A Co/Pd multilayered film has greater perpendicular magnetic anisotropy than a CoCr alloy film, so it will be used for recording media (see J. Appl. Phys., vol. 87, p. 6887 (1988)). Layer stacking separations of the conventional multilayered films are several nm, and each of the layers is very thin and constituted by several atomic layers.

On the other hand, a NiFe single layer film, whose saturation magnetic flux density (Bs) is 1-1.5T, has been used as a conventional material of a write-head. Thickness of the film is several μm, namely the film is a thick one. In the future, a data transfer rate of a magnetic disk drive unit will be accelerated. Eddy current loss occurs in the thick magnetic film, so that writing performance of the write-head is made worse. To solve the problem, a multilayered film, in which magnetic layers and insulating layers are alternately piled, has been studied. In the multilayered film, resistance of the insulating layers and the magnetic layers is high, and the thickness of the film is less than skin depth, e.g., submicron, so that eddy current loss can be restricted.

To make magnetic anisotropy small and gain enough soft magnetism, amorphous, micro crystals and granular magnetic films have been studied as the magnetic layer. Furrther, by employing the multilayered structure, the magnetic layers are statically magnetic-connected, so that a magnetic circuit is closed and frequency response can be improved. According to J.Magn. Soc. Jpn. vol. 14, p. 379 (1990) and J.Magn. Soc. Jpn. vol. 15, p. 391 (1991), an amorphous metal CoNbZr and a micro crystal FeSiN are used as materials of the magnetic layers. Saturation magnetic flux density of the magnetic layers is 0.8-1.85T. However, recording density will be even higher, so a track width and a pole length of a front end section of a magnetic pole must be smaller so as to write smaller bits.

Further, coercivity of recording media will be increased so as to limit thermal decay of magnetization of magnetic minute particles. Magnetic materials must have high saturation magnetic flux density (Bs) to generate a higher magnetic field for writing data. Therefore, enough magnetic fields cannot be generated with amorphous and microcrystal materials, whose Bs is 0.8-1.85T. An FeCo alloy is a thermal equilibrium alloy having maximum Bs of 2.45T, but its magnetostriction constant ($\lambda$) is large, e.g., $30\text{-}70 \times 10^{-6}$, so an inverse magnetostrictive effect, which is caused by isotropic stress generated while a layer is formed, cannot be ignored. Therefore, it is very difficult for the FeCo single layer to have soft magnetism with uniaxial magnetic anisotropy. In the case of using a magnetic material having isotropic magnetic characteristics as magnetic poles, data recorded on a recording media are apt to be erased by a leaked magnetic field corresponding to a residual magnetization (Br).

Erasing data by a write-head is more remarkable in a single pole type head for perpendicular magnetic recording than a ring head for longitudinal recording. Further, a front end of the single pole type head is formed like a needle. Even if a magnetic material in a state of as-depositing has uniaxial magnetic anisotropy and its Br in a direction of the hard axis is reduced, a leaked magnetic field is generated by shape magnetic anisotropy caused by the shape of the magnetic pole, so that there is possibility of erasing data by the leaked magnetic field. To solve the problem, a magnetic material, which has high Bs and which is capable of restraining uniaxial magnetic anisotropy and shape magnetic anisotropy, is required.

To increase Bs, adding impurities, which accelerate crystal growth, must be restrained. In crystal magnetic materials, e.g., FeCo, columnar growth and enlarging crystals in a thickness direction of a layer are more remarkable than those in amorphous and glanular alloy films. Therefore, roughness of a surface of a layer or unevenness of crystals obstruct to form multilayer with other materials. Namely, materials must be selected with fully considering the roughness.

In the FeCo single layer, a underlayer is formed immediately under the FeCo alloy layer so as to have soft magnetism with high Bs. According to IEEE. Trans. Magn. vol. 36 p. 2506-2508 (2000), an FeCoN magnetic layer has soft magnetism and high Bs, e.g., 2.4T. However, it is difficult to control magnetic anisotropy of the FeCoN single layer. To solve this problem, the FeCoN layer is formed on a underlayer, which is made of permalloy of $Ni_{80}Fe_{20}$, or the FeCoN layer is sandwiched between the layers made of the permalloy of $Ni_{80}Fe_{20}$, so that the soft magnetism is improved. In said report, thickness of the FeCoN layer is 0.1 μm, and there is no description about soft magnetism of the layer whose thickness is more than 0.1 μm. To enhance the writing magnetic field, it is effective to make thickness of a high Bs layer of a front end of a magnetic pole 0.1 μm or more. By forming the FeCoN layer on the NiFe underlayer, the soft magnetism is improved by magnetic coupling between the two layers. And, magnetoelastic anisotropy, which is caused by residual stress generated while a layer is formed, is not dominant.

On the other hand, in IEEE. Trans. Magn. vol.38 p. 2225-2227 (2002), a underlayer made of a nonmagnetic material (NiFeCr) is disclosed. The underlayer is capable of improving the soft magnetism of FeCo as well as the underlayer made of NiFe. The fact means that the magnetic coupling between the underlayer and the FeCoN layer is not an essential factor of improving the soft magnetism. The magnetic layer having high Bs and soft magnetism is required so as to write data in a recording media, which has a high coercivity and high recording density, with high writing accuracy and improve magnetic response. However, FeCo layers, which have such required properties, have not developed.

SUMMARY OF THE INVENTION

To solve the problem of erasing data by the magnetic field leaked from a magnetic pole, there are several ways, for example: giving uniaxial magnetic anisotropy to a magnetic layer; closing a magnetic circuit by a multilayered film, in which a magnetic layer and a nonmagnetic layer are static-magnetically coupled; and accelerating antiparallel magnetization sequence between magnetic layers by exchange coupling so as to increase a saturated magnetic field (Hs). Therefore, materials, which estrain residual stress in layers, gives uniaxial magnetic anisotropy to nonmagnetic layers (a underlayer and/or an intermediate layer), close a magnetic circuit between magnetic layers and generate antiferromagnetic coupling between magnetic layers, are required. Further, if a surface of an FeCo layer is rough, a nonmagnetic layer cannot magnetically insulate FeCo layers, so that the magnetic circuit between the magnetic layers cannot be closed and the antiferromagnetic coupling disappears. Therefore, the roughness must be controlled.

An object of the present invention is to provide a magnetic film for a magnetic head, which includes an FeCo layer, restrains erasing data by a magnetic field leaked from a magnetic pole, has high saturation magnetic flux density and soft magnetism and writes data with high recording density.

To achieve the object, the present invention has following structures.

Namely, the magnetic film for a magnetic head of the present invention comprises: a nonmagnetic layer including at least one selected from a group of Ru, Rh, Ir, Cr, Cu, Au, Ag, Pt and Pd; a magnetic layer including Fe and Co, wherein anisotropy magnetic field is 0.8 kA/m or more.

In the magnetic film, the saturation magnetic flux density may have uniaxial magnetic anisotropy, and residual stress in the film may be ±0.5 GPa or less.

Another magnetic film of the present invention comprises: nonmagnetic layers, each of which has a first layer section and a second layer section; and magnetic layers, each of which includes Fe and Co, wherein the first layer section and the second layer section are respectively include at least one selected from a group of Ru, Rh, Ir, Cr, Cu, Au, Ag, Pt and Pd, the nonmagnetic layer and the magnetic layer are alternately piled, and thickness of each magnetic layer is 100 nm or less. With this structure, roughness of the surface can be improved, so that generating a leaked magnetic field, which leaks from a magnetic pole to a recording meda, can be restrained and erasing recorded data can be prevented.

In the magnetic film, the magnetic layer may include 40-80 at % of Fe.

And, the magnetic film of the present invention comprises: a nonmagnetic layer, which has a first layer section and a second layer section; and a magnetic layer, which includes Fe and Co, wherein the first layer section and the second layer section are respectively include at least one selected from a group of Ru, Rh, Ir, Cr, Cu, Au, Ag, Pt and Pd, boundary parts of the magnetic layer, which contact the nonmagnetic layer, includes 30-65 at % of Fe, and an intermediate part of the magnetic layer, which is formed between the boundary parts, includes 40-80 at % of Fe.

In the magnetic film, thickness of the magnetic layer may be 100 nm or less.

Further, the magnetic film for a magnetic head includes Fe and Co as main elements, wherein the magnetic film has a body-centered cubic lattice structure, in which intensity ratio of (110) and (211) crystal planes in a film growth direction is I(211)/I(110)=2-100%. With this structure, the magnetic film has high saturation magnetic flux density and good soft magnetism. Crystal orientation of the FeCo magnetic film can be controlled on the basis of intensity ratio of X-ray diffraction, so that a recording magnetic field can be increased and magnetic response of a magnetic pole can be improved. Therefore, the magnetic head using the magnetic film is capable of recording data with high density.

In the magnetic film, the magnetic film may have uniaxial magnetic anisotropy having a easy axis of magnetization and a hard axis of magnetization, a coercivity of the hard axis of magnetization may be 0.8 kA/m or less, and residual magnetization ratio of the hard axis of magnetization (Brh/Bsh) may be 30% or less.

The magnetic films of the present invention are capable of providing high writing magnetic fields and good magnetic response, so they can be used for magnetic heads capable of writing data with high recording density. By piling the magnetic layer and the nonmagnetic layer, a recording magnetic field can be increased, and the leaked magnetic field, which is leaked from the magnetic pole and erases recorded data, can be restrained. Therefore, reliability of recording data and recording density can be improved.

BRIEF DESCRIPTION OF THE DRAWINGS

Embodiments of the present invention will now be described by way of examples and with reference to the accompanying drawings, in which.

DETAILED DESCRIPTION OF THE EMBODIMENTS

Preferred embodiments of the present invention will now be described in detail with reference to the accompanying drawings.

Figure 14:
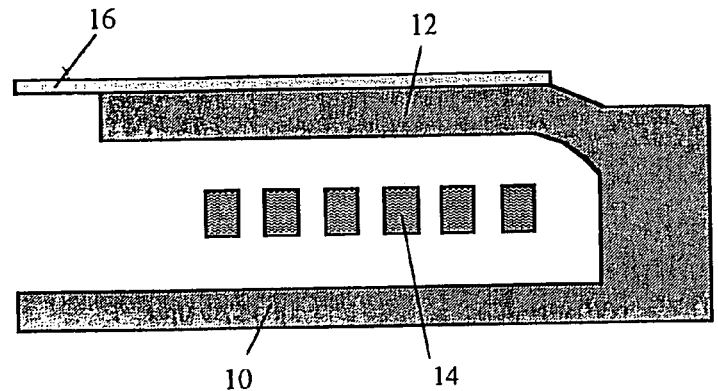
FIG. 14 is a sectional view of a write-magnetic pole of a magnetic head of an embodiment.

A sectional view of a write-magnetic pole of a magnetic head for perpendicular recording is shown in FIG. 14. A symbol 10 stands for a lower magnetic pole, a symbol 12 stands for an upper magnetic pole, and a symbol 14 stands for a coil. A magnetic film is provided to a front end 16 of the upper magnetic pole 12. In the magnetic film, magnetic layers made of Fe and Co and nonmagnetic layers are alternately piled.

Figure 15A:
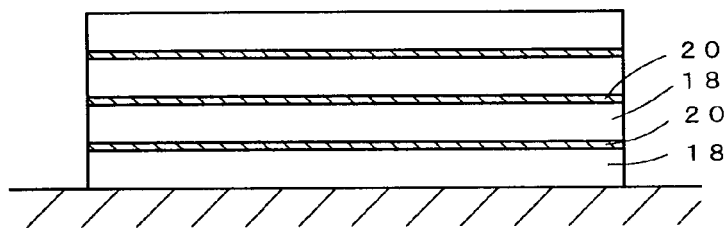
FIGS. 15A-15C are explanation views of examples of the magnetic films.
Figure 15B:
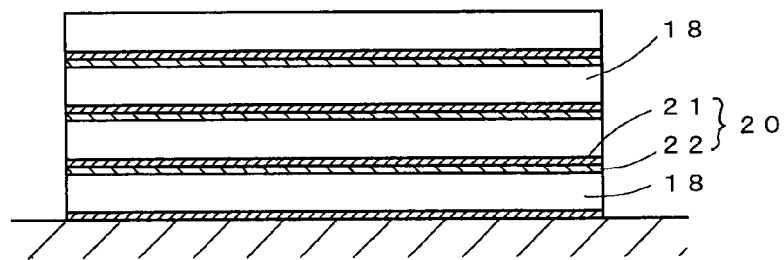
Figure 15C:
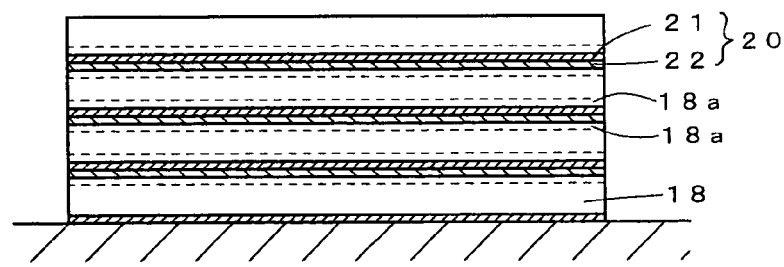

Examples of the magnetic film are shown in FIGS. 15A-15C. In FIG. 15A, magnetic layers 18 and nonmagnetic layers 20 are alternately piled. In FIG. 15B, the nonmagnetic layers 20, each of which has a underlayer section (a first layer section) 21 and an intermediate layer section (a second layer section) 22, and the magnetic layers 18 are alternately piled. In FIG. 15C, boundary parts 18a of each magnetic layer 18, which respectively contact the nonmagnetic layers, are made of an FeCo alloy.

Firstly, samples of magnetic films were prepared. Each sample had an FeCo layer (a magnetic layer) and an Ru layer (a nonmagnetic layer). The layers were formed by sputtering. Characteristics of the samples were examined. Each sample of the magnetic film was formed in the same vacuum chamber by sputtering $Fe_{70}Co_{30}$ and Ru. Note that, composition of FeCo is indicated by unit of at %. Purity of $Fe_{70}Co_{30}$ and Ru target were 99.9% or more. Sputtering pressure was 0.2-0.8 Pa, current density for sputtering was $1\text{-}10\times10^{-4}$ W/m², and amount of flow of argon was 50-100 sccm. A distance between the target and a substrate was 90-180 mm. The substrate was made of $Al_2O_3/TiC$.

Note that, in the present example, $Fe_{70}Co_{30}$ was combined with Ru, but Rh, Ir, Cr, Cu, Au, Ag, Pt and Pd may be used instead of Ru. A very small amount of other elements may further added. By adjusting film forming conditions, the same results can be gained.

Figure 1A:
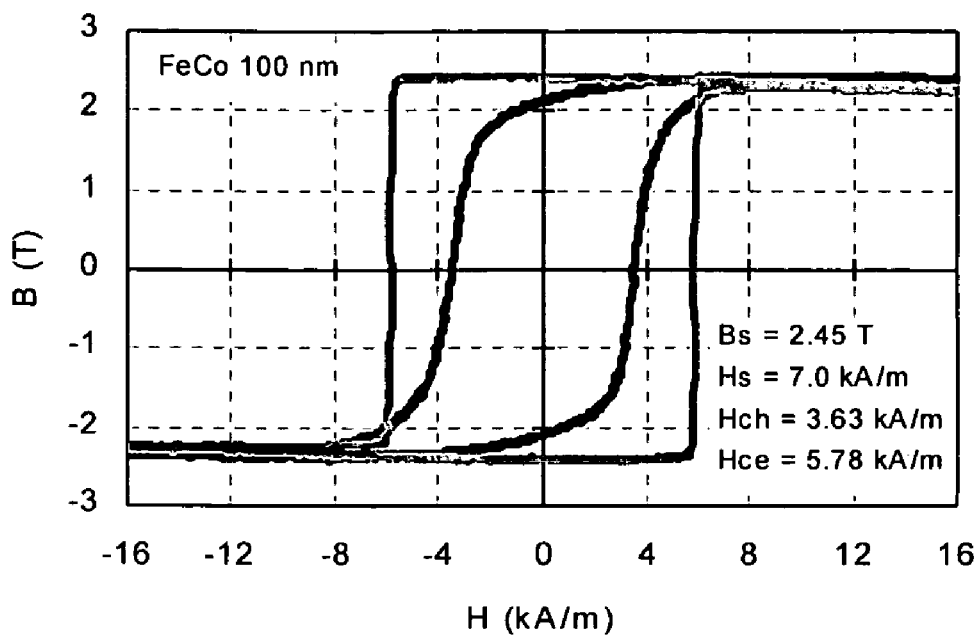
FIG. 1A is a graph showing B-H curves of an easy axis and a hard axis in a single film of $Fe_{70}Co_{30}$ (100 nm)
Figure 1B:
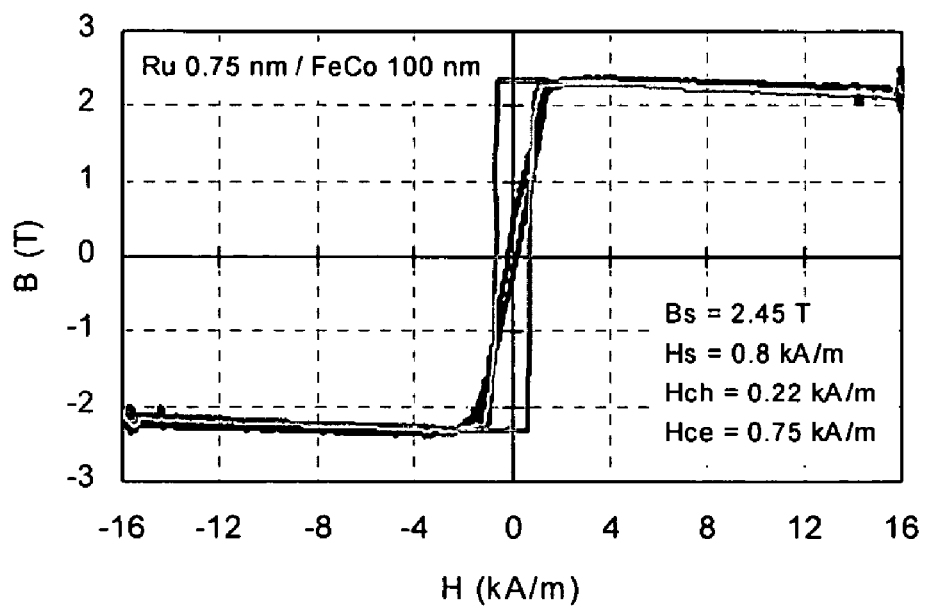
FIG. 1B is a graph showing B-H curves of an easy axis and a hard axis in a multilayered film including an Ru underlayer (0.75 nm) and an $Fe_{70}Co_{30}$ layer (100 nm)

FIG. 1A is a graph showing B-H curves of an easy axis and a hard axis in a single film of $Fe_{70}Co_{30}$ (–100 nm); and FIG. 1B is a graph showing B-H curves of an easy axis and a hard axis in a multilayered film including an Ru underlayer (–0.75 nm) and an $Fe_{70}Co_{30}$ layer (–100 nm).

In FIG. 1A, the $Fe_{70}Co_{30}$ layer was formed on the $Al_2O_3/TiC$ substrate. hysteresis appeared in the B-H curve of the hard axis, and residual magnetization Brh and coercivity Hch were increased. On the other hand, in FIG. 1B, the the $Fe_{70}Co_{30}$ layer was formed on the Ru underlayer (0.75 nm). Clear uniaxial magnetic anisotropy was observed, and a saturated magnetic field Hs was 0.8 kA/m. Residual magnetization Brh was reduced, and residual magnetization ratio Brh/Bsh was 5% or less. Further, the anisotropy can be controlled by pressure for forming films and the distance between the target and the substrate, so that Hs can be 0.8 kA/m or more.

Figure 2A:
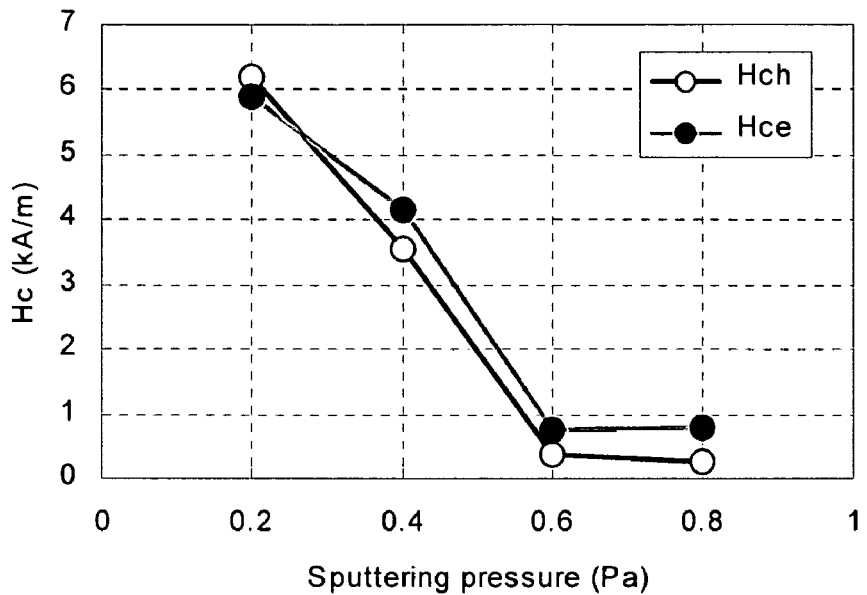
FIG. 2A is a graph showing coercivity Hce and Hch of the easy axis and the hard axis with respect to the sputtering pressure for forming the $Fe_{70}Co_{30}$ layer of the multilayered film including the Ru underlayer (0.75 nm) and the $Fe_{70}Co_{30}$ layer (100 nm)
Figure 2B:
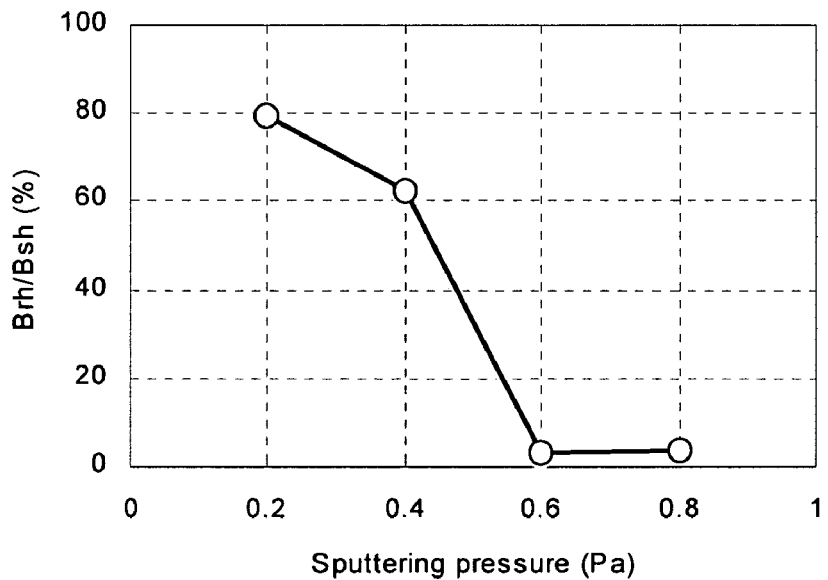
FIG. 2B is a graph showing residual magnetization ratio Brh/Bsh of the hard axis with respect to the sputtering pressure for the same.

In the examples shown in FIGS. 1A and 1B, the pressure for forming the $Fe_{70}Co_{30}$ layer was 0.8 Pa. Further, the B-H curves were measured with changing the pressure for forming the $Fe_{70}Co_{30}$ layer of the structure of Ru 0.75 nm/$Fe_{70}Co_{30}$ 100 nm. The results are shown in FIGS. 2A and 2B. FIG. 2A is a graph showing coercivity Hce and Hch of the easy axis and the hard axis with respect to the sputtering pressure for forming the $Fe_{70}Co_{30}$ layer of the multilayered film including the Ru underlayer (0.75 nm) and the $Fe_{70}Co_{30}$ layer (100 nm); and FIG. 2B is a graph showing residual magnetization ratio Brh/Bsh of the hard axis with respect to the sputtering pressure for the same.

According to FIGS. 2A and 2B, Hc and Brh/Bsh were suddenly increased when the pressure was 0.4 Pa or less. Namely, the uniaxial magnetic anisotropy was broken and had isotropy when the layers were formed under the low pressure condition.

Figure 3:
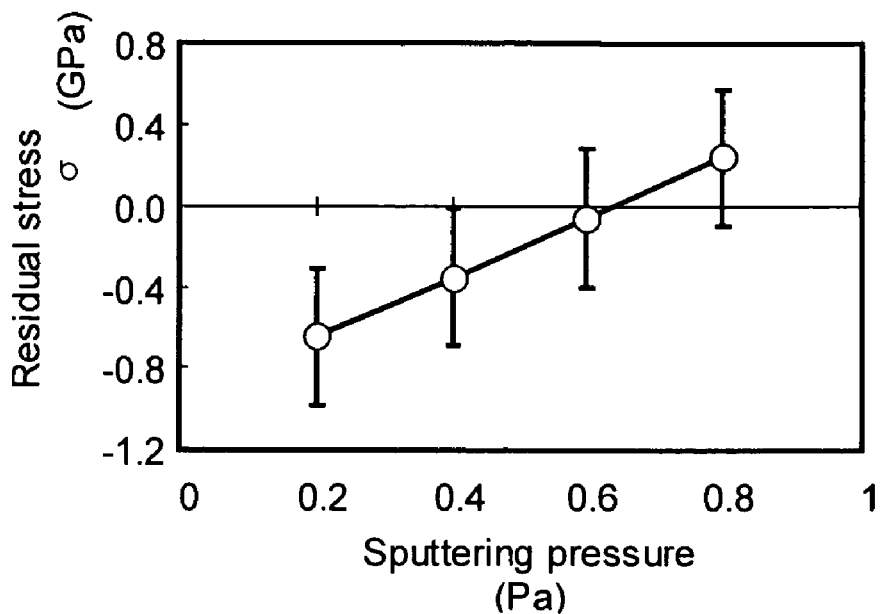
FIG. 3 is a graph showing residual stress a with respect to the sputtering pressure for forming the $Fe_{70}Co_{30}$ layer of the multilayered film including the Ru underlayer (0.75 nm) and the $Fe_{70}Co_{30}$ layer (100 nm)

FIG. 3 is a graph showing residual stress σ with respect to the sputtering pressure for forming the $Fe_{70}Co_{30}$ layer of the multilayered film including the Ru underlayer (0.75 nm) and the $Fe_{70}Co_{30}$ layer (100 nm). The residual stress a was estimated from differences between lattice constants calculated by X-ray diffraction and lattice constants of Bulk. Further, the residual stress was estimated from differences between amount of warping the substrate before forming the layer and that after forming the layer. The results were almost equal. In FIG. 3, minus values indicate compressive stress; plus values indicate tensile stress. The residual stress was linearly changed from the compressive stress to the tensile stress with increasing the pressure for forming the $Fe_{70}Co_{30}$ layer. Preferable magnetic characteristics were observed in a low residual stress range: ±0.5 GPa.

The magnetic characteristics became isotropic when the pressure was 0.4 Pa or less. The reason was that the $Fe_{70}Co_{30}$ layer had a large magnetostriction constant, e.g., $40\times10^{-6}$, so isotropic residual stress in the layer made a inverse magnetostrictive effect remarkable.

The pressure for forming layers or films is highly influenced by a diameter of a discharge tube of a film forming apparatus, a position of a vacuum meter, etc. In the case that vacuum meters indicate a same value, if films are formed in different film forming apparatuses, magnetic characteristics of the films are different. Therefore, performances of magnetic films should be defined by residual stress in films. According to the results shown in FIG. 3, magnetic films having uniaxial magnetic anisotropy can be formed by forming the Ru underlayer and having the residual stress of ±0.5 GPa. Further, the similar results can be gained in the whole composition range of an alloy $Fe_xCo_{100-x}$ (x=40-80 at %), which has high Bs.

According to the results, magnetic films having good uniaxial magnetic anisotropy and soft magnetism can be formed in the residual stress range of ±0.5 GPa. The magnetic film having the soft magnetism and the uniaxial magnetic anisotropy can be employed to a ring head for longitudinal recording. However, in the case of a single pole type head for perpendicular magnetic recording, if a magnetic circuit is closed or an antiparallel magnetization sequence is used so as to restrain a magnetic field leaked from the magnetic pole, piling the Ru/FeCo layers is required. In this case, very thin Ru layers, e.g., 0.75 nm, must be regularly inserted between the FeCo layers. If roughness of the FeCo layers are large, the Ru layer becomes a discontinuous layer, so that the magnetic layers are ferromagnetic-coupled. Therefore, roughness of the surfaces of the FeCo layers are important factor.

Figure 4:
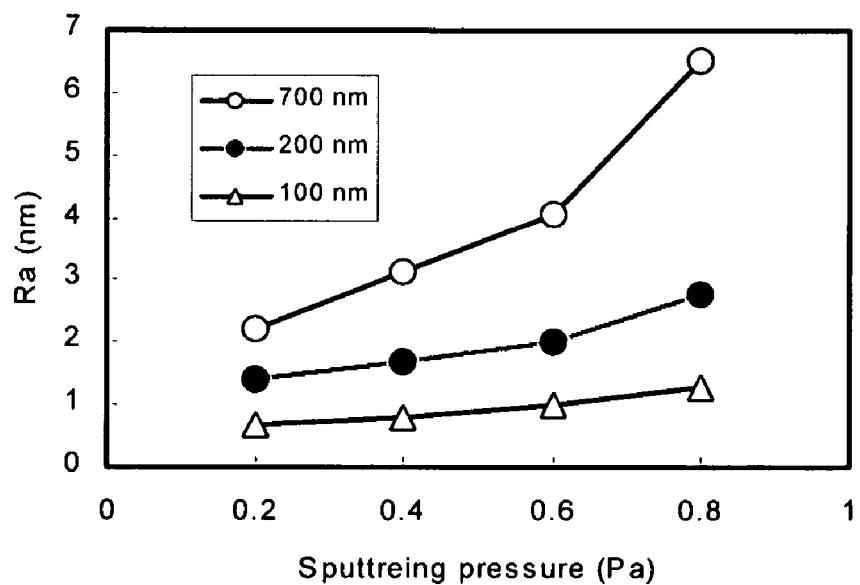
FIG. 4 is a graph showing surface roughness Ra with respect to the sputtering pressure for forming the $Fe_{70}Co_{30}$ layer of the multilayered film including the Ru underlayer (0.75 nm) and the $Fe_{70}Co_{30}$ layer (100 nm)

Samples, which have the same Ru underlayer (0.75 nm) and $Fe_{70}Co_{30}$ layers having different thickness (100 nm, 200 nm and 700 nm), were prepared. Roughness Ra of surfaces of the samples with respect to the sputtering pressure (the film forming pressure) were observed by a atomic force microscope (AFM.) The results are shown in FIG. 4. The roughness is increased with increasing the sputtering pressure and thickness of the films. Since the roughness is large when the sputtering pressure is 0.6 Pa or more, in which good soft magnetism can be gained, the thickness of the FeCo layers are limited so as to close magnetic circuits between the FeCo layers, between which the Ru layer is inserted, and antiferromagnetic-couple the FeCo layers.

Figure 5:
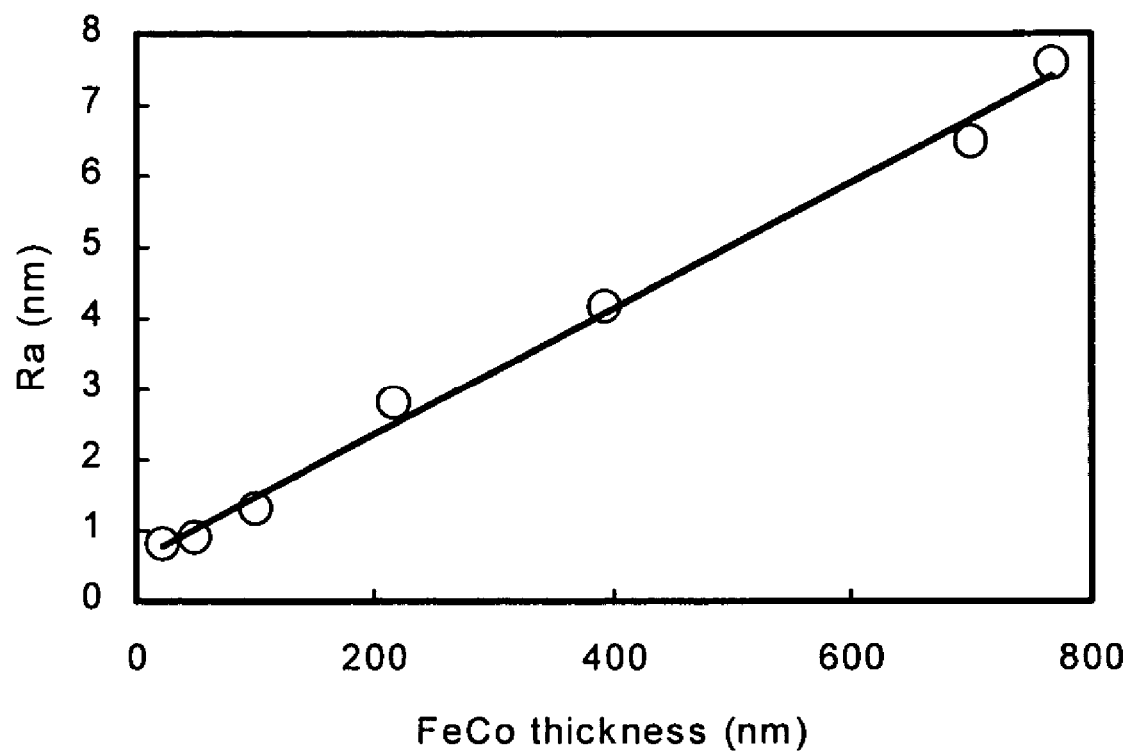
FIG. 5 is a graph showing the surface roughness Ra with respect to thickness of the $Fe_{70}Co_{30}$ layer of the multilayered film including the Ru underlayer (0.75 nm) and the $Fe_{70}Co_{30}$ layer (100 nm)

FIG. 5 is a graph showing the roughness with respect to the thickness of the $Fe_{70}Co_{30}$ layer. The sputtering pressure was 0.8 Pa. A pitch of varying the thickness is finer. The roughness exceeded 2 nm when the thickness was 200 nm or more, and the antiferromagnetic coupling between the FeCo layers, between which the Ru layer was inserted, disappeared. Therefore, the maximum thickenss of the FeCo layers, which constitute the multilayered film, is 100 nm.

Figure 6:
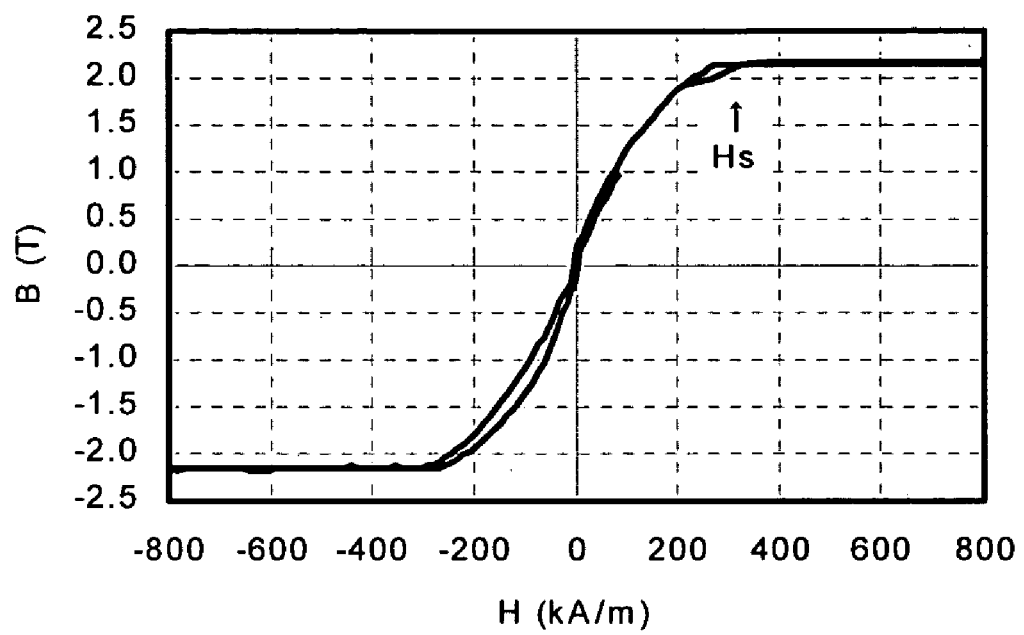
FIG. 6A is a graph showing B-H curves of a multilayered film (Ru 0.75 nm/$Fe_{70}Co_{30}$ 7.5 nm)×27.
FIG. 6B is a graph showing B-H curves of a multilayered film (Ru 0.75 nm/$Fe_{50}Co_{50}$ 0.5 nm/$Fe_{70}Co_{30}$ 6.5 nm/$Fe_{50}Co_{50}$ 0.5 nm)×27.
Figure 6B:
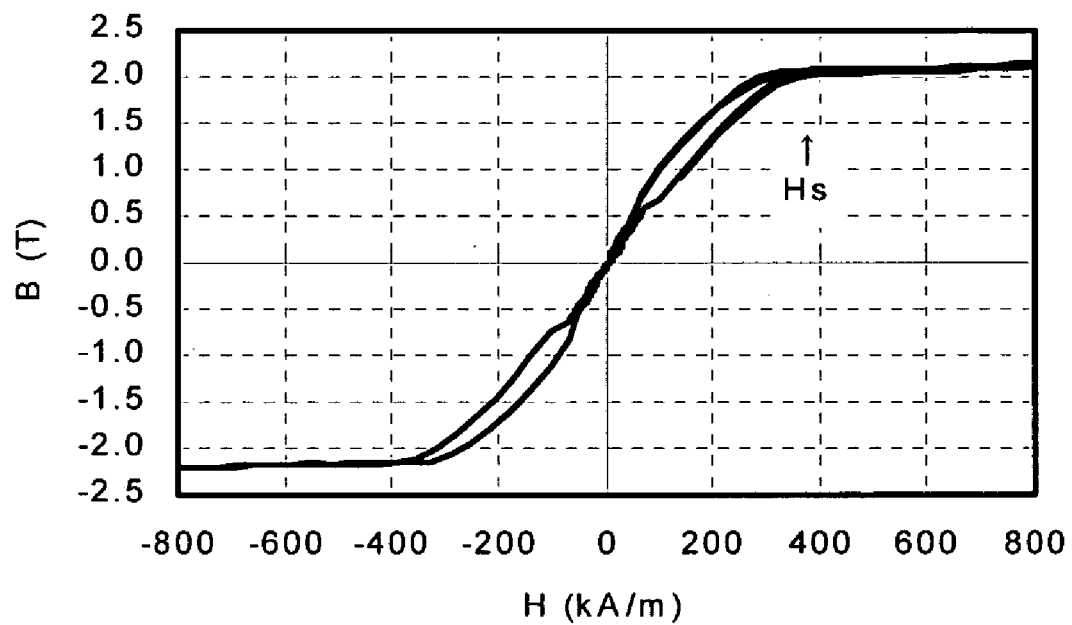

FIG. 6A is a graph showing B-H curves of a multilayered film (Ru 0.75 nm/$Fe_{70}Co_{30}$ 7.5 nm)×27; and FIG. 6B is a graph showing B-H curves of a multilayered film (Ru 0.75 nm/$Fe_{50}Co_{50}$ 0.5 nm/$Fe_{70}Co_{30}$ 6.5 nm/$Fe_{50}Co_{50}$ 0.5 nm)×27. Note that, the $Fe_{70}Co_{30}$ layers are formed under the conditions for forming the former samples.

As shown in FIG. 6A, a saturated magnetic field Hs was 240 kA/m, the high Hs was caused by antiferromagnetic coupling between magnetic layers, between which a nonmagnetic layer was inserted. As clearly shown in FIG. 6B, the multilayered film ((Ru 0.75 nm/$Fe_{50}Co_{50}$ 0.5 nm/$Fe_{70}Co_{30}$ 6.5 nm/$Fe_{50}Co_{50}$ 0.5 nm)×27) had the high Hs, e.g., 360 kA/m because the $Fe_{50}Co_{50}$ layers were provided on the both sides of the $Fe_{70}Co_{30}$ layer. Increasing the Hs were gained within a composition range of $Fe_xCo_{100-x}$ (x=30-65 at %). By increasing the Hs, shape anisotropy of a front end of a single pole type head for perpendicular magnetic recording can be reduced, so that erasing data by the magnetic pole can be restrained.

Bs and Hs of multilayered films, in which surfaces of FeCo layers are repeatedly etched by reverse sputtering before forming Ru layers, are shown in TABLE.

TABLE

| Film composition | n | Bs (T) | Hs (kA/m) |
| --- | --- | --- | --- |
| Ru 0.75 nm\$Fe_{70}Co_{30}$ 200 nm | 1 | 2.44 | 2 |
| (Ru 0.75 nm\$Fe_{70}Co_{30}$ 7.5 nm) × n | 27 | 2.23 | 240 |
| (Ru 0.75 nm\$Fe_{50}Co_{50}$ 0.5 nm\ $Fe_{70}Co_{30}$ 6.5 nm\$Fe_{50}Co_{50}$ 0.5 nm) × n | 27 | 2.20 | 360 |
| (Ru 0.75 nm\$Fe_{70}Co_{30}$ 7.5 nm\(etching)) × n | 27 | 2.23 | 280 |
| (Ru 0.75 nm\$Fe_{50}Co_{50}$ 0.5 nm\ $Fe_{70}Co_{30}$ 6.5 nm\$Fe_{50}Co_{50}$ 0.5 nm\ (etching)) × n | 27 | 2.20 | 400 |

Note that, the reverse sputtering were executed under the conditions of 500 W and 0.2 Pa.

By etching, the Hs was increased with maintaining the Bs 2.2T or more. A surface of the FeCo layer was made flat by etching, so that antiferromagnetic coupling between the FeCo layers, between which the Ru layer was inserted, was tightened and the Hs was increased. Further, the surface of the FeCo layer was made flat by gas cluster ion beams (GCIB); the Hs was increased as well as etching. According to TABLE, the Hs of the multilayered film was several hundreds times as great as that of a single FeCo film whose thickness is equal to total thickness of the FeCo layers of the multilayered film. By inserting the nonmagnetic layers, the Bs of the multilayered film was reduced, but the Bs can be maintained 2.0T or more by controlling thickness of the magnetic layers and the nonmagnetic layers.

As described above, the stress can be reduced by controlling anisotropy, inserting the nonmagnetic layers for contributing to the antiferromagnetic coupling and controlling the conditions of forming the film, so that the magnetic layers can have uiaxial magnetic anisotropy, and the Hs is increased by the antiferromagnetic coupling. Further, the thickness of the magnetic layers are made 0.1 μm or less so as to limit the roughness of the surfaces to 2 nm or less, and cycle of thickness of the layers are adjusted so as to make the Bs 2.0T or more. With this structure, the magnetic field for recording data can be increased, and erasing data by the magnetic field leaked from the magnetic poles can be restrained. Therefore, reliability of recording data can be improved, and data can be recorded with high density. The magnetic film can be properly applied to the magnetic head for perpendicular recording.

Examples of FeCo alloys having high Bs and soft magnetism will be explained with reference to FIGS. 7-13.

Thickness of FeCo layers of samples were 200-800 nm, and thickness of Ru underlayer thereof were 0.8 nm (fixed). Air in a vacuum chamber was discharged until inner pressure reached $10^{-5}$ Pa. Sputtering pressure for forming the FeCo layer was 0.6 Pa; sputtering pressure for forming the Ru layer was 0.5 Pa. Sputtering current density for forming the FeCo layer was $6×10^{-4}$ W/m$^2$; sputtering current density for forming the Ru layer was $5×10^{-4}$ W/m$^2$. Amount of flow of argon was 50 sccm. Distances between targets and substrates were 90 mm. The targets were FeCo and Ru whose purity were 99.95% or more.

Co of FeCo targets were 10-60 at %, the substrates were made of silicon, glass and $Al_2O_3$/TiC. Other materials may be used for the substrates. In the following description, the substrates were made of silicon, and composition of the FeCo layer was $Fe_{100-x}Co_x$ (x=30 at %). Note that, the underlayer may be made of other elements or alloy instead of the Ru underlayer, and a very small amount of impurities may be added to the FeCo layer.

Figure 7:
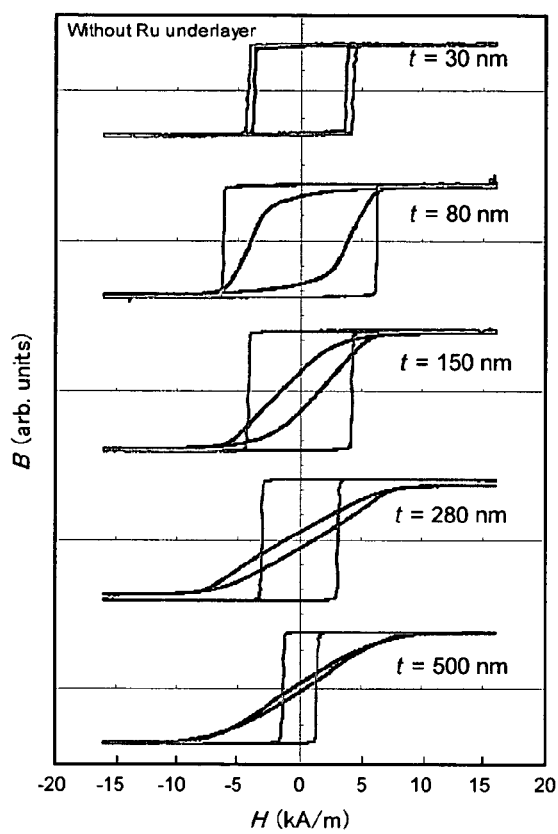
FIG. 7 is a graph showing B-H curves of $Fe_{70}Co_{30}$ single layer films having different thickness.

FIG. 7 is a graph showing B-H curves of $Fe_{70}Co_{30}$ single layer films having different thickness t. No Ru underlayer were used. Uniaxial magnetic anisotropy was appeared, and differences of the B-H curves in an easy axis and a hard axis were made greater with increasing the thickness of the FeCo layers.

Figure 8:
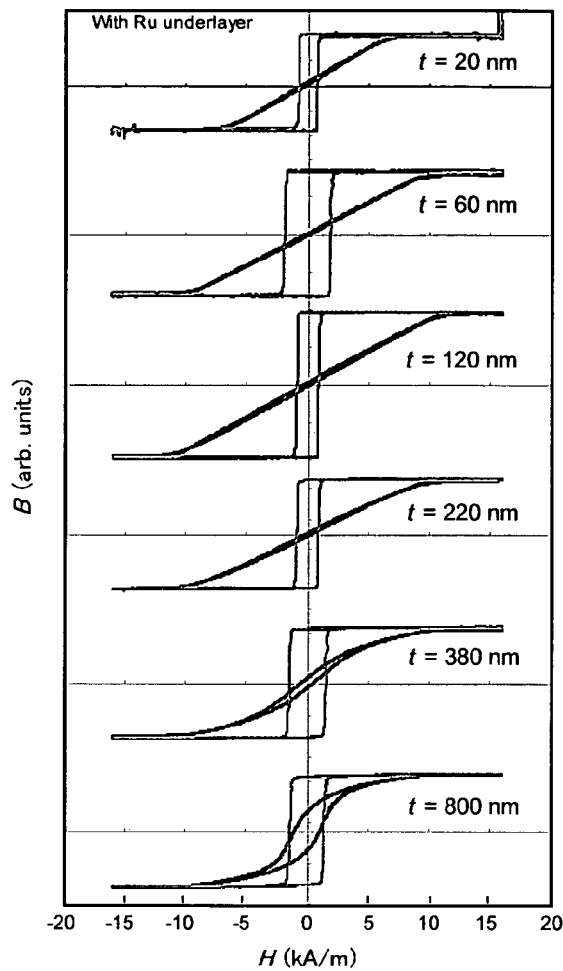
FIG. 8 is a graph showing B-H curves of $Fe_{70}Co_{30}$ films having different thickness, each of which includes an Ru underlayer (0.8 nm)

FIG. 8 is a graph showing B-H curves of $Fe_{70}Co_{30}$ films having different thickness t, each of which included the Ru underlayer (0.8 nm). The Ru underlayers were formed on the silicon substrates. Unlike the results shown in FIG. 7, uniaxial magnetic anisotropy was made obvious when the FeCo layers were thin. When the FeCo layers were thick, the uniaxial magnetic anisotropy disappeared.

Figure 9:
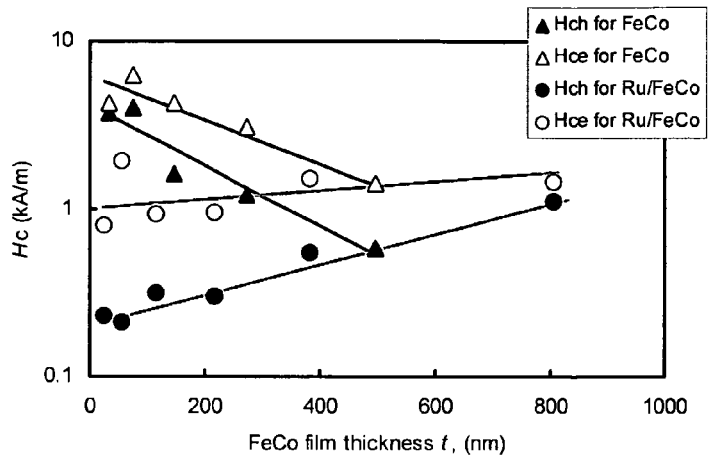
FIG. 9 is a graph showing coercivity Hce and Hch of the easy axis and the hard axis with respect to thickness of the FeCo films including Ru underlayer and the FeCo single layer films.

FIG. 9 is a graph showing coerciviity Hce and Hch of the easy axis and the hard axis with respect to thickness of the FeCo films including the Ru underlayers (see FIG. 8) and the FeCo films including no underlayers (see FIG. 7). In the case of the films including no underlayers, the Hce and the Hch were reduced with increasing the thickness of the FeCo layers; in the case of the films including the Ru underlayers, the Hce and the Hch were increased with increasing the thickness of the FeCo layers.

Figure 10:
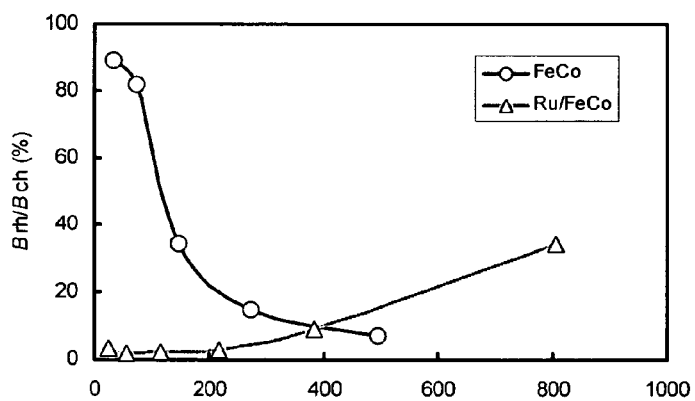
FIG. 10 is a graph showing residual magnetization ratio Brh/Bsh of the hard axis with respect to the thickness of the FeCo films including Ru underlayer and the FeCo single layer films.

FIG. 10 is a graph showing residual magnetization ratio Brh/Bsh of the hard axis with respect to the thickness of the FeCo films including Ru underlayers (see FIG. 8) and the FeCo films including no underlayers (see FIG. 7). Note that, Brh stands for residual magnetic flux density, and Bsh stands for saturated magnetic flux density. A leaked magnetic field corresponding to the Brh erases data without magnetizing, so the residual magnetization ratio Brh/Bsh should be small. In the case of the films including no underlayers, the Brh/Bsh was reduced with increasing the thickness of the FeCo layers; in the case of the films including the Ru underlayers, the Brh/Bsh was increased with increasing the thickness of the FeCo layers.

Therefore, the Hc and the Brh/Bsh are depend on the thickness of the FeCo layer. However, the dependence of the film including Ru underlayer is opposite to that of the film including no underlayer. To study the difference, the inventors examined the FeCo film including no underlayer. The examination was X-ray (Cu—K α ray) diffraction (θ-2θ scanning).

Figure 11:
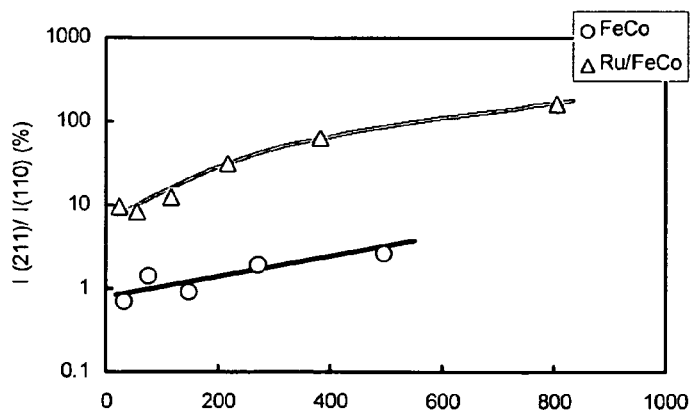
FIG. 11 is a graph showing diffraction intensity ratio $I_{(211)}/I_{(110)}$ of the FeCo films including Ru underlayer and the FeCo single layer films with respect to thickness of the FeCo films.

FIG. 11 is a graph showing diffraction intensity ratio $I_{(211)}/I_{(110)}$ of the FeCo films including Ru underlayers and the FeCo films including no underlayers with respect to thickness of the FeCo films. Diffraction intensity was measured at (110) and (211) crystal planes of bcc-FeCo. In the case of the FeCo films including no underlayers, the $I_{(211)}/I_{(110)}$ were lower than those of the FeCo films including the Ru underlayers. Namely, (110) orientation was larger. The $I_{(211)}/I_{(110)}$ was made larger with increasing the thickness of the FeCo layer, and the (110) orientation was broken. On the other hand, in the case of the FeCo films including the Ru underlayers, the $I_{(211)}/I_{(110)}$ were large even if the FeCo layers were thin. Namely, no (110) orientation was observed. The $I_{(211)}/I_{(110)}$ were made further larger with increasing the thickness of the FeCo layers, and (211) orientation was made larger.

Figure 12:
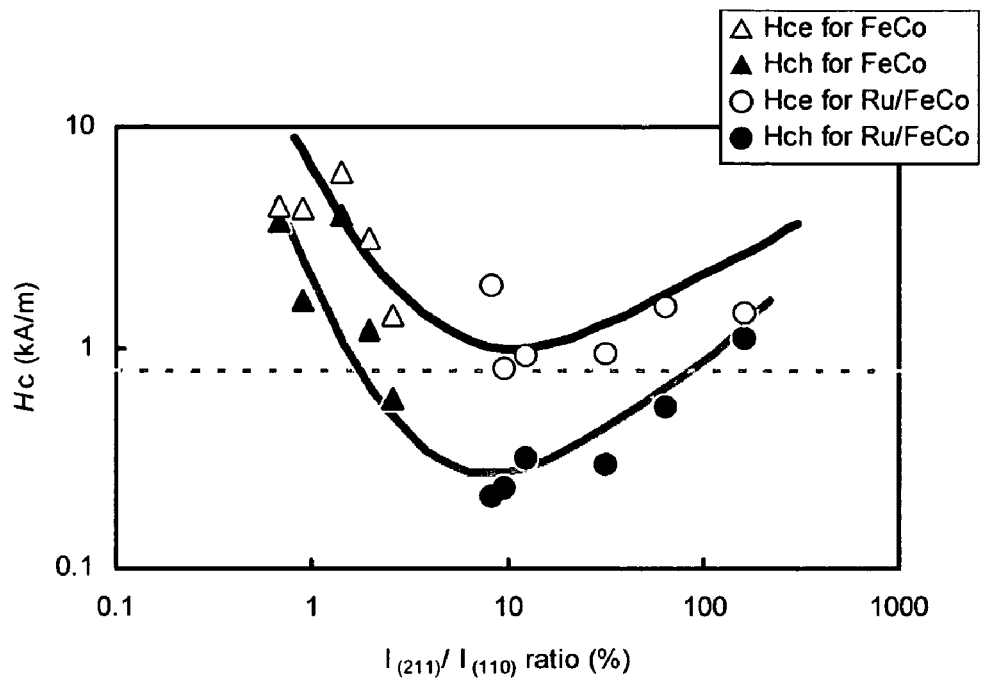
FIG. 12 is a graph showing coercivity Hce and Hch of the FeCo films including Ru underlayer and the FeCo single layer films with respect to diffraction intensity ratio $I_{(211)}/I_{(110)}$.
Figure 13:
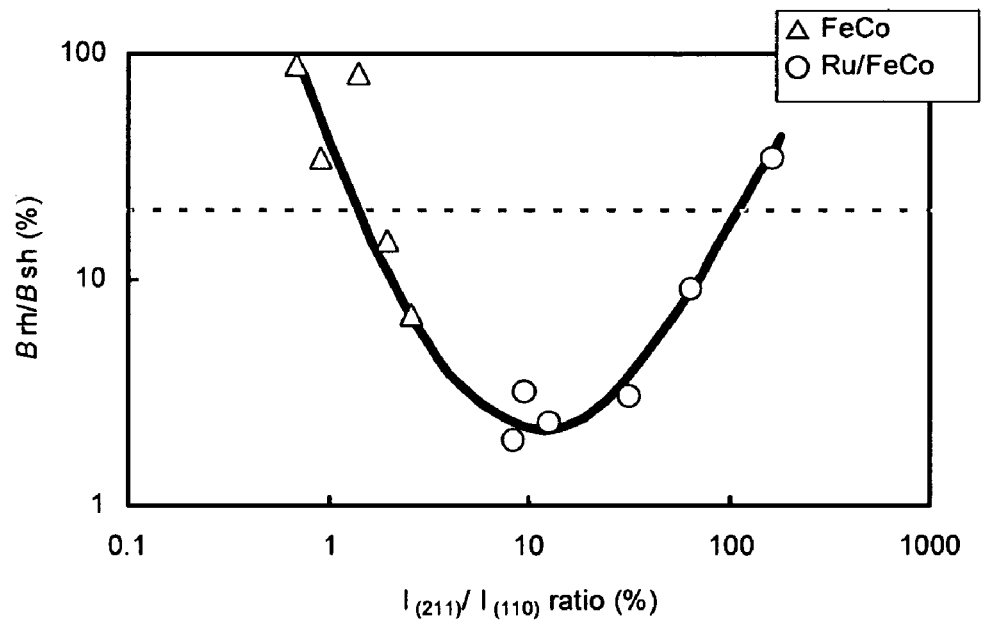
FIG. 13 is a graph showing residual magnetization ratio Brh/Bsh of the FeCo films including Ru underlayer and the FeCo single layer films with respect to diffraction intensity ratio $I_{(211)}/I_{(110)}$.

FIG. 12 is a graph showing coercivity Hce and Hch of the FeCo films including Ru underlayers and the FeCo films including no underlayers with respect to diffraction intensity ratio $I_{(211)}/I_{(110)}$. The relationship is based on the results shown in FIGS. 9 and 11. The Hce and the Hch were minimum when the $I_{(211)}/I_{(110)}$ was 10-30%. Preferably, reversible flux reversal of the hard axis is used in a write-head, so the Hch should be small. When the Hch is 0.8 kA/m, the preferable $I_{(211)}/I_{(110)}$ is 2-100%. In that range of the $I_{(211)}/I_{(110)}$, the Brh/Bsh was 30% (see FIG. 13).

Therefore, crystal structures which are not extremely orientated to (110) or (211) are required so as to limit the Hch and the Brh/Bsh low. Then, the preferred diffraction intensity ratio $I_{(211)}/I_{(110)}$ is 2-100%. If crystals are randomly orientated when the FeCo layers are continuously formed, crystal magnetic anisotropy is averaged, and effect magnetic anisotropy can be effectively reduced. Therefore, low coercivity can be realized. Further, by continuously forming the FeCo layers, the Bs of the FeCo layers can be gained. In the experiment, the Bs of $Fe_{70}Co_{30}$ was 2.4-2.45T.

The invention may be embodied in other specific forms without departing from the spirit or essential characteristics thereof. The present embodiments are therefore to be considered in all respects as illustrative and not restrictive, the scope of the invention being indicated by the appended claims rather than by foregoing description and all changes which come within the meaning and range of equivalency of the claims are therefore intended to be embraced therein.

What is claimed is:

1. A laminated magnetic film for a magnetic head, comprising:
   a nonmagnetic layer including at least one selected from a group consisting of Ru, Rh, Ir, Cu, Au, Ag, Pt and Pd; and
   a magnetic layer including Fe and Co,
   wherein an anisotropy magnetic field is 0.8 kA/m or more,
     wherein a diffraction intensity ratio $I_{(211)}/I_{(110)}$ of each of the magnetic layers is 10-100%, and wherein a thickness of each of the magnetic layers is 20-380 nm.

2. The laminated magnetic film according to claim 1, wherein the saturation magnetic flux density has uniaxial magnetic anisotropy, and
   residual stress in said film is between approximately −0.5 Gpa and +0.5 Gpa.

3. The laminated magnetic film according to claim 1, wherein roughness of the surface of said magnetic layer is 2 nm or less.

4. The laminated magnetic film according to claim 1, wherein total saturation magnetic flux density is 2.0 T or more.

5. A multilayered film for a magnetic head, comprising:
   two or more nonmagnetic layers; and
   two or more magnetic layers,
   wherein each of the nonmagnetic layers includes at least one element selected from a group of Ru, Rh, Ir, Cr, Au, Ag, Pt and Pd,
   wherein each of the magnetic layers includes Fe and Co, and
   wherein a saturated magnetic field is 0.8 kA/m or more,
     wherein a driffraction intensity ratio $I_{(211)}/I_{(110)}$ of each of the magnetic layers is 10-100%, and wherein a thickness of each of the magnetic layers is 20-380 nm.

6. The multilayered film according to claim 5, wherein the saturation magnetic flux density has uniaxial magnetic anisotropy, and
   residual stress in said film is between approximately −0.5 Gpa and +0.5 Gpa.

7. The multilayered film according to claim 5, wherein roughness of the surface of said film is 2 nm or less.

8. The multilayered film according to claim 5, wherein total saturation magnetic flux density is 2.0 T or more.

* * * * *